(12) United States Patent
Hayashi et al.

(10) Patent No.: US 7,818,363 B2
(45) Date of Patent: Oct. 19, 2010

(54) COMMUNICATIONS SYSTEM, COMMUNICATIONS METHOD, NETWORK MANAGER, AND TRANSFER DEVICE

(75) Inventors: Yasuhisa Hayashi, Yokohama (JP); Takeshi Ihara, Yokosuka (JP); Masami Yabusaki, Kashiwa (JP); Manhee Jo, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 462 days.

(21) Appl. No.: 11/850,397

(22) Filed: Sep. 5, 2007

(65) Prior Publication Data

US 2008/0008184 A1    Jan. 10, 2008

Related U.S. Application Data

(63) Continuation of application No. 10/375,024, filed on Feb. 28, 2003, now abandoned.

(30) Foreign Application Priority Data

Mar. 1, 2002    (JP) .............................. 2002-056474

(51) Int. Cl.
    *G06F 15/16*    (2006.01)
(52) U.S. Cl. ...................... 709/200; 709/230; 709/238
(58) Field of Classification Search .................. 709/200, 709/227, 230, 238
    See application file for complete search history.

(56) References Cited

U.S. PATENT DOCUMENTS

| 5,463,736 | A | * | 10/1995 | Elko et al. ..................... 710/28 |
| 5,517,500 | A |   | 5/1996  | White et al. |
| 6,094,682 | A | * | 7/2000  | Nagasawa .................... 709/224 |
| 6,108,708 | A | * | 8/2000  | Iwata .......................... 709/238 |
| 6,128,666 | A | * | 10/2000 | Muller et al. ................ 709/238 |
| 6,151,324 | A | * | 11/2000 | Belser et al. ................. 370/397 |

(Continued)

FOREIGN PATENT DOCUMENTS

EP    0 767 562 A2    4/1997

(Continued)

OTHER PUBLICATIONS

Yoshitake Tajima, et al., "A Traffic Engineering Scheme in a Global Networking Service Platform", The Institute of Electronics, Information and Communication Engineers, vol. 100, No. 672, Mar. 2, 2001, pp. 241-248.

(Continued)

*Primary Examiner*—Faruk Hamza
(74) *Attorney, Agent, or Firm*—Oblon, Spivak, McClelland, Maier & Neustadt, L.L.P.

(57) ABSTRACT

A communications system which allows data transfer not using a terminal ID assigned by an access network but using routing information distinct from the terminal ID is provided. The communications system transmits data including, as a destination address, a second terminal ID, from a first terminal to the second terminal via a plurality of transfer devices. A first transfer device includes a first memory for storing the second terminal ID and routing information for routing the data to a second transfer device, associating them with one another, and a routing processor for adding to the data the routing information for routing the data to the second transfer device associated with the second terminal ID included in the data, and transferring the data to the second transfer device.

2 Claims, 11 Drawing Sheets

U.S. PATENT DOCUMENTS

| | | | |
|---|---|---|---|
| 6,154,839 A * | 11/2000 | Arrow et al. ................. | 713/154 |
| 6,457,044 B1 * | 9/2002 | IwaZaki .................... | 709/206 |
| 6,473,406 B1 * | 10/2002 | Coile et al. ................. | 370/248 |
| 6,542,496 B1 | 4/2003 | Hirota et al. | |
| 6,594,704 B1 | 7/2003 | Birenback et al. | |
| 6,779,035 B1 | 8/2004 | Gbadegesin | |
| 6,816,890 B2 | 11/2004 | Noda et al. | |
| 6,888,847 B2 * | 5/2005 | Ueno ........................ | 370/469 |
| 6,892,245 B1 | 5/2005 | Crump et al. | |
| 6,936,805 B2 * | 8/2005 | Ahn ........................... | 250/205 |
| 6,985,960 B2 * | 1/2006 | Takashima et al. .......... | 709/238 |
| 7,216,175 B1 * | 5/2007 | Sitaraman et al. .......... | 709/229 |
| 7,313,596 B2 * | 12/2007 | Tani et al. ................... | 709/205 |
| 7,406,085 B2 * | 7/2008 | Hadjiahmad et al. ... | 370/395.54 |
| 7,409,458 B2 * | 8/2008 | Namihira .................... | 709/238 |
| 7,457,304 B2 * | 11/2008 | Roh et al. ................... | 370/406 |
| 2001/0002365 A1 | 5/2001 | Minakuchi et al. | |
| 2001/0028648 A1 | 10/2001 | Suzuki | |
| 2002/0038379 A1 * | 3/2002 | Sato et al. ................... | 709/238 |
| 2002/0112060 A1 * | 8/2002 | Kato .......................... | 709/227 |
| 2005/0165957 A1 * | 7/2005 | Choi et al. ................. | 709/238 |
| 2008/0195753 A1 * | 8/2008 | Shimada .................... | 709/238 |
| 2008/0310430 A1 * | 12/2008 | He ............................. | 370/400 |

FOREIGN PATENT DOCUMENTS

| | | |
|---|---|---|
| EP | 0 984 602 A2 | 3/2000 |
| JP | 2-215247 | 8/1990 |
| JP | 5-268254 | 10/1993 |
| JP | 8-251179 | 9/1996 |
| JP | 10-313314 | 11/1998 |
| JP | 2000-209264 | 7/2000 |
| JP | 2001-168906 | 6/2001 |
| JP | 2001-211196 | 8/2001 |
| KR | 2000-0039908 | 7/2000 |
| WO | WO 00/70458 | 11/2000 |
| WO | WO 01/61922 A2 | 8/2001 |
| WO | WO 01/97461 A1 | 12/2001 |
| WO | WO 01/97485 A2 | 12/2001 |

OTHER PUBLICATIONS

Masatake Miyabe et al., "A Study of the GMPLS Control Architecture for IP Photonic Network", The Institute of Electronics, Information and Communication Engineers, vol. 101, No. 508, Dec. 10, 2001, pp. 61-66.

* cited by examiner

FIG.4

| DESTINATION TERMINAL ID | DESTINATION TRANSFER DEVICE ID | TRANSFER INFORMATION | CONTROL INFORMATION |
|---|---|---|---|
| ID-TERMINAL 51 | RA-20₁ | RA-30₃ | 64Kbps |
| ID-TERMINAL 52 | RA-30₁ | Wireless | - |

FIG.6A

| DESTINATION TERMINAL ID | SOURCE TERMINAL ID | CONTROL INFORMATION | USER INFORMATION |
|---|---|---|---|

FIG.6B

| DESTINATION TRANSFER DEVICE ID | DESTINAITON TERMINAL ID | SOURCE TERMINAL ID | USER INFORMATION |
|---|---|---|---|

FIG.7A

| COMMUNICATION ID ELEMENT | SOURCE TERMINAL ID | DESTINAITON TERMINAL ID | DESTINATION TRANSFER DEVICE ID |
|---|---|---|---|
| | | | |

FIG.7B

| COMMUNICATION ID ELEMENT | SOURCE TERMINAL ID | DESTINAITON TERMINAL ID | DESTINATION TRANSFER DEVICE ID | TRANSFER INFORMATION | CONTROL INFORMATION |
|---|---|---|---|---|---|
| 71 | ID-TERMINAL 52 | ID-TERMINAL 51 | RA-201 | RA-303 | 64Kbps |
| 72 | ID-TERMINAL 51 | ID-TERMINAL 52 | RA-301 | Wireless | - |

FIG.9A

| DESTINAITON TERMINAL ID | SOURCE TERMINAL ID | CONTROL INFORMATION |
|---|---|---|

FIG.9B

| COMMUNICATION ID ELEMENT | USER INFORMATION |
|---|---|

FIG.9C

| DESTINATION TRANSFER DEVICE ID | COMMUNICATION ID ELEMENT | USER INFORMATION |
|---|---|---|

FIG.11A

| DESTINAITON TERMINAL ID | SOURCE TERMINAL ID | CONTROL INFORMATION | USER INFORMATION |
|---|---|---|---|

FIG.11B

| NETWORK DESTINATION TERMINAL ID | NETWORK SOURCE TERMINAL ID | CONTROL INFORMATION | USER INFORMATION |
|---|---|---|---|

FIG.12

| SOURCE TERMINAL ID | DESTINATION TRANSFER DEVICE ID | TRANSFER INFORMATION | CONTROL INFORMATION |
|---|---|---|---|
| ID-TERMINAL 52 | NWID-TERMINAL 51 | RA-303 | 64Kbps |
| ID-TERMINAL 51 | NWID-TERMINA 52 | Wireless | - |

US 7,818,363 B2

COMMUNICATIONS SYSTEM, COMMUNICATIONS METHOD, NETWORK MANAGER, AND TRANSFER DEVICE

CROSS-REFERENCE TO RELATED APPLICATIONS

This application is a continuation of U.S. patent application Ser. No. 10/375,024, filed on Feb. 28, 2003, and is based upon and claims the benefit of priority from the prior Japanese Patent Application No. P2002-056474, filed on Mar. 1, 2002. The entire contents of these applications are incorporated herein by reference.

BACKGROUND OF THE INVENTION

1. Field of the Invention

The present invention relates to a communications system and a communications method for transmitting data including, as a destination address, a second terminal ID (information identifying the second terminal), from a first terminal to the second terminal via a plurality of transfer devices, and a transfer device and a network manager suitable for use therein.

2. Description of the Related Art

In a conventional communications system, a terminal moving within a communications network uses address information assigned by an access network with which the terminal has newly established connection at a new location, for communications. A given address information piece is assigned to the terminal from among address information pieces assigned to an access network to which the terminal is physically connected.

The conventional communications system, however, has a problem in that when the terminal conducts communications using the assigned address information, the party on the other end of the connection can detect from the address information the access network to which the above terminal is physically connected. That is, in such a case, the location information of the user can be problematically leaked to the party on the other end.

As an art designed to provide packet transmitting and receiving functions to a terminal moving within a communications network under the same setting environment, "Mobile IP" is known.

Under "Mobile IP," in order to prevent the leakage of the location information of the user, the terminal always transmits to the party on the other end, data with a "home address" assigned by a "home agent" of a "home network" set as the source address. The party on the other end always transmits data provided with the "home address" to the terminal, assuming that the terminal is located in the "home network." As a result, the data transmitted from the party on the other end is always transferred to the "home network (home agent)" of the terminal and then transferred from the "home network" to a network to which the terminal is connected at that time.

The conventional communications system using "Mobile IP," however, has a problem in that the terminal needs to perform complicated settings so as to specify information for transfer to the terminal, for the "home agent."

The conventional communications system using "Mobile IP" has another problem in view of a data transfer path in which data transferred must pass through a relay point (home agent) constituting a triangular path.

The conventional communications system using "Mobile IP" has yet another problem in that the terminal needs to perform highly functional processing. The terminal needs, for example, to hold both the address information assigned by an access network to which the terminal is connected, and the home address of the terminal, and to perform such processing as releasing the encapsulation of packets received.

The conventional communications system using "Mobile IP" has still another problem in that it is required to transmit and receive packets in a format which includes an information element constituting an overhead, even in a radio section between the terminal and an access point in the access network.

The conventional communications system using "Mobile IP" has still another problem in that it is based on "end-to-end data transfer", a basic principle of the internet protocol, and the terminal needs to specify, as transfer information, both a terminal ID and routing information (that is, address information assigned by an access network and a terminal home address) for data transfer.

The conventional communications system using "Mobile IP" has still another problem in that path-to-path processing, routing processing, or the like, results in a transmission mode including redundant path information.

The conventional communications system using "Mobile IP" has still another problem in that since bandwidth control is performed by encapsulation using MPLS or the like, the party on the other end can detect the location information of the terminal from address information assigned by an access network.

BRIEF SUMMARY OF THE INVENTION

The present invention has been made in view of the above and has an object of providing a communications system and a communications method which allow data transfer not using a terminal ID assigned by an access network but using routing information distinct from the terminal ID, and a transfer device and a network manager suitable for use therein.

According to the present invention, there is provided a communications system for transmitting data including, as a destination address, a second terminal ID (information identifying a second terminal), from a first terminal to the second terminal via a plurality of transfer devices, the system comprising: a first transfer device connected to the first terminal, the first transfer device comprising: a first memory configured to store the second terminal ID and routing information for routing the data to a second transfer device connected to the second terminal, associating them with one another; and a routing processor configured to add to the data the routing information associated with the second terminal ID included in the data received from the first terminal, and to transfer the data to the second transfer device.

The communications system preferably further comprises a network manager, the network manager comprising: a second memory configured to store the second terminal ID and the routing information for routing the data to the second transfer device, associating them with one another; and an instruction information transmitter configured to transmit instruction information including the routing information for routing the data to the second transfer device associated with the second terminal ID, in response to a transfer request including the second terminal ID transmitted from the first transfer device; wherein, the first transfer device comprises a transfer request transmitter configured to transmit the transfer request to the network manager upon receiving a transmission request for the data from the first terminal; and the first memory stores the second terminal ID and the routing information for routing the data to the second transfer device, associating them with one another, according to the instruction information from the network manager.

The instruction information transmitter preferably transmits the instruction information to the second transfer device. The first memory preferably stores the second terminal ID and the routing information for routing the data to the second transfer device, associating them with one another, according to the instruction information received via the second transfer device.

The data transmission request preferably includes control information on the transmission of the data from the first terminal to the second terminal. The first memory preferably stores the second terminal ID, the routing information for routing the data to the second transfer device and the control information, associating them with one another. The routing processor preferably transfers the data to the second transfer device, based on the control information.

The first memory alternatively stores a first terminal ID (information identifying the first terminal), the second terminal ID, the routing information for routing the data to the second transfer device and a communication ID element, associating them with one another. The routing processor preferably adds to the data the routing information associated with the communication ID element included in the data received from the first terminal, and transfers the data to the second transfer device.

The network manager alternatively comprises a third memory configured to store the first terminal ID, the second terminal ID, the routing information for routing the data to the second transfer device and the communication ID element, associating them with one another; and an instruction information transmitter configured to transmit instruction information including the routing information and the communication ID element associated with the first terminal ID and the second terminal ID, in response to a transfer request including the first terminal ID and the second terminal ID transmitted from the first transfer device. The first transfer device preferably comprises a transfer request transmitter configured to transmit the transfer request to the network manager upon receiving a transmission request for the data from the first terminal. The first memory preferably stores the first terminal ID, the second terminal ID, the routing information for routing the data to the second transfer device and the communication ID element, associating them with one another, according to the instruction information from the network manager.

According to the present invention, there is provided a communications method of transmitting data including, as a destination address, a second terminal ID, from a first terminal to the second terminal via a plurality of transfer devices, the method comprising the step of: A) adding to the data, at a first transfer device which is connected to the first terminal and stores the second terminal ID and routing information for routing the data to a second transfer device to which the second terminal is connected, associating them with one another, the routing information associated with the second terminal included in the data, and transferring the data to the second transfer device.

The communications method preferably further comprises the steps of: B) transmitting, at the first transfer device, a transfer request including the second terminal ID to a network manager upon receiving a transmission request for the data from the first terminal; C) transmitting, at the network manager, instruction information including the routing information associated with the second terminal ID, in response to the transfer request transmitted from the first transfer device; and D) storing, at the first transfer device, the second terminal ID and the routing information for routing the data to the second transfer device, associating them with one another, according to the instruction information from the network manager.

In step C), the network manager preferably transmits the instruction information to the second transfer device; and in step D), the first transfer device preferably stores the second terminal ID and the routing information for routing the data to the second transfer device, associating them with one another, according to the instruction information received via the second transfer device.

In step B), the data transmission request preferably includes control information on the transmission of the data from the first terminal to the second terminal; the first transfer device preferably stores the second terminal ID, the routing information for routing the data to the second transfer device and the control information, associating them with one another; and in step A), the first transfer device preferably transfers the data to the second transfer device based on the control information.

The first transfer device alternatively stores the first terminal ID, the second terminal ID, the routing information for routing the data to the second transfer device and a communication ID element, associating them with one another; and in step A), the first transfer device adds to the data the routing information associated with the communication ID element included in the data received from the first terminal, and transfers the data to the second transfer device.

The communications method preferably further comprises the steps of: E) transmitting, at the first transfer device, a transfer request including the first terminal ID and the second terminal ID to a network manager upon receiving a transmission request for the data from the first terminal, the network manager storing the first terminal ID, the second terminal ID, the routing information for routing the data to the second transfer device and the communication ID information element, associating them with one another; F) transmitting, at the network manager, instruction information including the routing information and the communication ID element associated with the first terminal ID and the second terminal ID, in response to the transfer request transmitted from the first transfer device; and G) storing, at the first transfer device, the first terminal ID, the second terminal ID, the routing information for routing the data to the second transfer device and the communication ID element, associating them with one another, according to the instruction information from the network manager.

According to the invention, there is provided a first transfer device connected to a first terminal for transmitting data including, as a destination address, a second terminal ID, from the first terminal to the second terminal, the first transfer device comprising: a first memory configured to store the second terminal ID and routing information for routing the data to a second transfer device to which the second terminal is connected, associating them with one another; and a routing processor configured to add to the data the routing information associated with the second terminal ID included in the data, and to transfer the data to the second transfer device.

The first transfer device preferably further comprises: a transfer request transmitter configured to transmit a transfer request including the second terminal ID to a network manager upon receiving a transmission request for the data from the first terminal; wherein, the first memory stores the second terminal ID and the routing information for routing the data to the second transfer device, associating them with one another, upon receiving instruction information including the routing information associated with the second terminal ID from the network manager.

The first memory alternatively stores a first terminal ID, the second terminal ID, the routing information for routing the data to the second transfer device and a communication ID element, associating them with one another; and the routing processor adds to the data the routing information associated with the communication ID element included in the data received from the first terminal, and transfers the data to the second transfer device.

The first transfer device further comprises a transfer request transmitter configured to transmit a transfer request including the first terminal ID and the second terminal ID to a network manager upon receiving a transmission request for the data from the first terminal. The first memory stores the first terminal ID and the second terminal ID, the routing information for routing the data to the second transfer device and the communication ID element, associating them with one another, according to instruction information from the network manager.

According to the invention, there is provided a network manager for managing a communications system for transmitting data including, as a destination address, a second terminal ID, from a first terminal to the second terminal via a plurality of transfer devices, the network manager comprising: a second memory storing the second terminal ID and routing information for routing the data to a second transfer device to which the second terminal is connected, associating them with one another; and an instruction information transmitter configured to transmit instruction information including the routing information associated with the second terminal ID, in response to a transfer request including the second terminal ID transmitted from a first transfer device to which the first terminal is connected.

According to the invention, there is provided a network manager for managing a communications system for transmitting data including a second terminal ID as a destination address and including a first terminal ID as a source address, from the first terminal to the second terminal via a plurality of transfer devices, the network manager comprising: a third memory configured to store the first terminal ID, the second terminal ID, routing information for routing the data to a second transfer device to which the second terminal is connected and a communication ID element, associating them with one another; and an instruction information transmitter configured to transmit instruction information including the routing information for routing the data to the second transfer device to which the second terminal is connected and the communication ID element associated with the first terminal ID and the second terminal ID, in response to a transfer request including the first terminal ID and the second terminal ID transmitted from a first transfer device.

BRIEF DESCRIPTION OF THE SEVERAL VIEWS OF THE DRAWINGS

FIG. 4 is a diagram exemplifying the configuration of a terminal ID-routing information-control information associating unit of the transfer device according to the first embodiment of the present invention;

FIGS. 6A and 6B are diagrams exemplifying formats of data transferred in the communications system according to the first embodiment of the present invention;

FIGS. 7A and 7B are diagrams exemplifying the configuration of a terminal ID-routing information-control information associating unit of a transfer device according to a second embodiment of the present invention;

FIGS. 9A to 9C are diagrams exemplifying formats of data transferred in the communications system according to the second embodiment of the present invention;

FIGS. 11A and 11B are diagrams exemplifying formats of data transferred in a communications system according to a modification of the present invention; and FIG. 12 is a diagram exemplifying the configuration of a terminal ID-routing information-control information associating unit of a transfer device according to the modification of the present invention.

DETAILED DESCRIPTION OF THE INVENTION

Configuration of a Communications System in Embodiment 1

Figure 1:
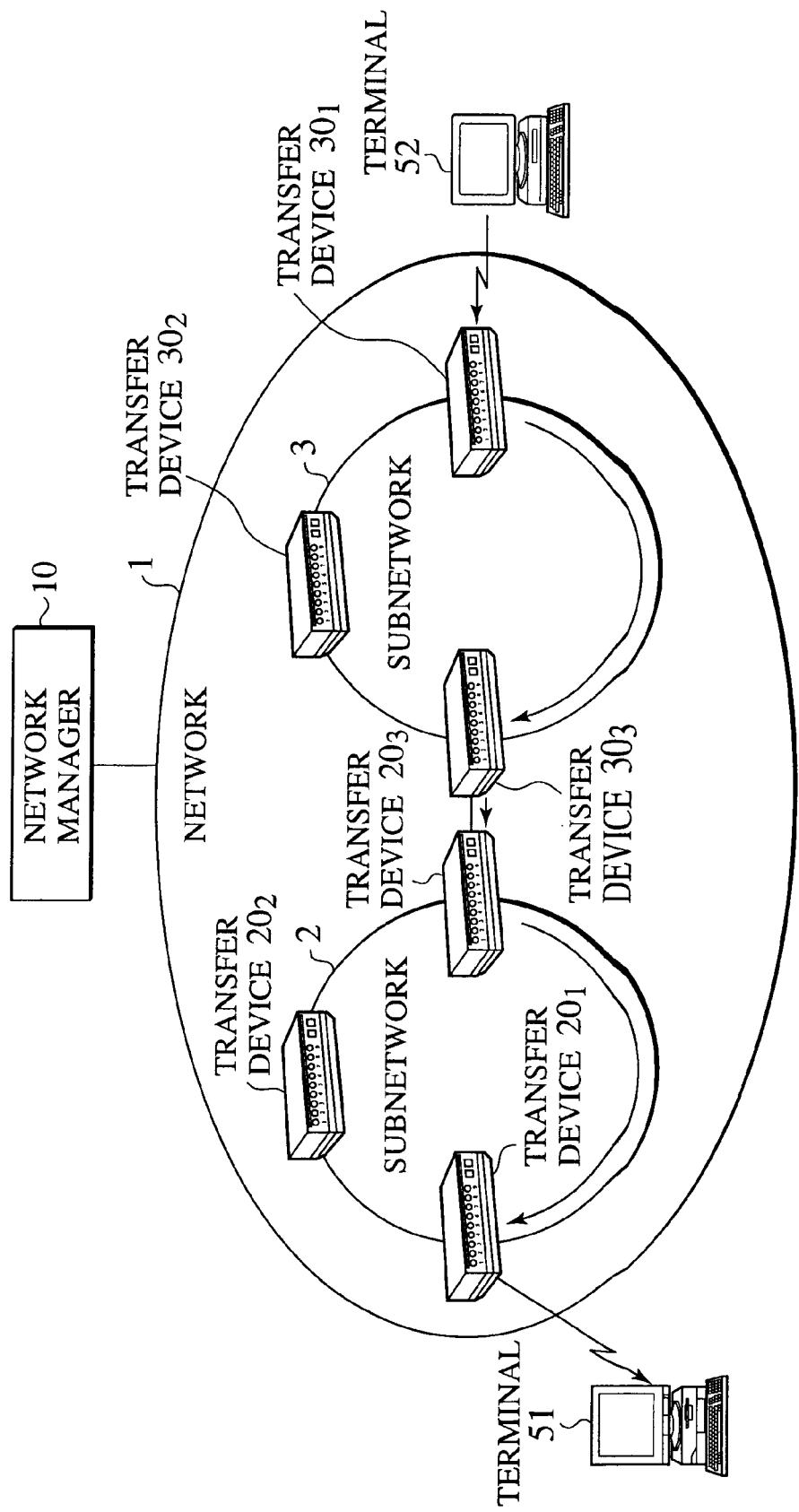
FIG. 1 is a diagram of the entire configuration of a communications system according to a first embodiment of the present invention.
Figure 2:
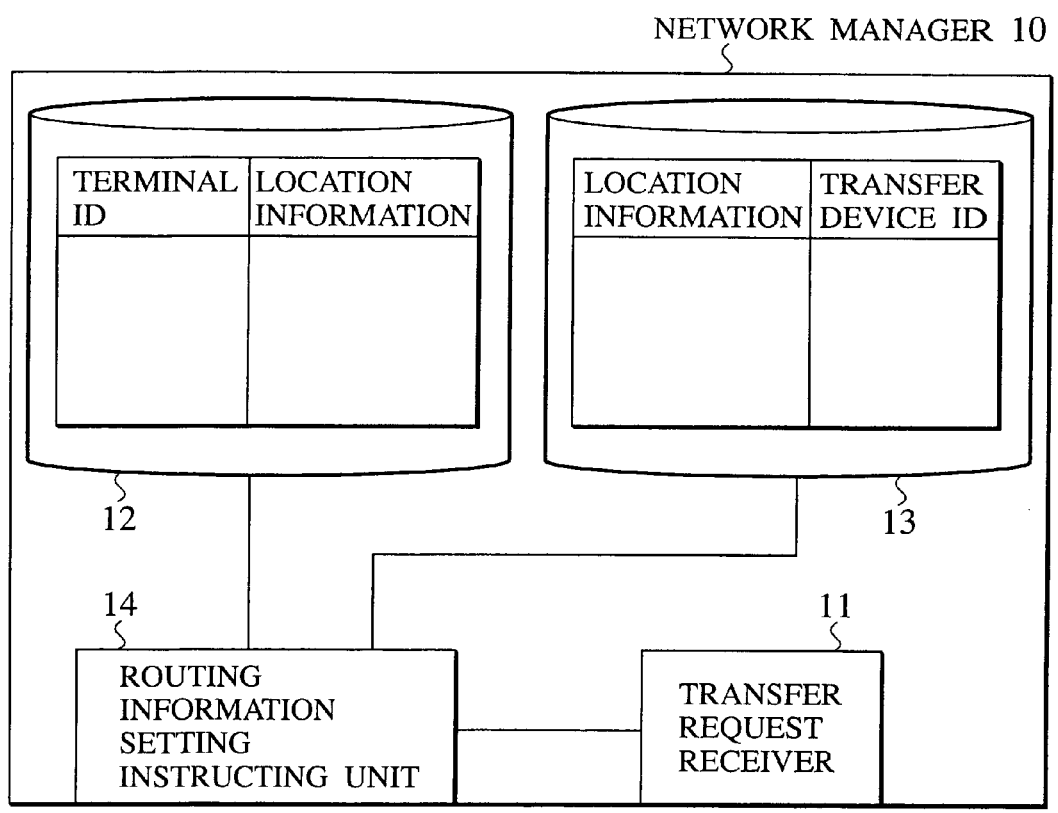
FIG. 2 is a functional block diagram of a network manager according to the first embodiment of the present invention.

The configuration of a communications system according to a first embodiment of the present invention will be described with reference to FIGS. 1 to 3. FIG. 1 illustrates the entire configuration of the communications system of this embodiment.

The communications system of this embodiment transmits data including information identifying a second terminal 51 (hereinafter referred to as an ID-terminal 51) as the destination address and including information identifying a first terminal 52 (hereinafter referred to as an ID-terminal 52) as the source address, from the first terminal 52 to the second terminal 51 via a plurality of transfer devices $30_1$, $30_3$, $20_3$ and $20_1$, as shown in FIG. 1.

The first terminal 51 and the second terminal 52 can move in subnetworks (access networks) 2 and 3 constituting a network 1, being connected to the transfer devices (access points) $30_1$ and $20_1$, for example, in the subnetworks 2 and 3 in a wireless or wired system. This embodiment will be described with the first terminal 51 and the second terminal 52 wirelessly connected to the transfer devices (access points) $30_1$ and $20_1$, for example, in the subnetworks 2 and 3.

The "ID-terminal 51" and "ID-terminal 52" may be any address information such as IP addresses assigned to the first terminal 52 and the second terminal 51, respectively.

The communications system of this embodiment includes a network manager 10 and a plurality of transfer devices $20_1$ to $20_3$ and $30_1$ to $30_3$, as shown in FIG. 1.

The network manager 10 manages the communications system (network 1) of this embodiment. More specifically, the network manager 10 includes, as shown in FIG. 2, a transfer request receiver 11, a terminal ID-location information associating unit 12, a location information-transfer device ID associating unit 13, and a routing information setting instructing unit 14.

The transfer request receiver 11 is connected to the routing information setting instructing unit 14. The receiver 11 receives a "transfer request" including the "the second terminal ID (destination terminal ID, ID-terminal 51)" transmitted from the first transfer device $30_1$ to which the first terminal 52 is connected, and transmits the received transfer request to the routing information setting instructing unit 14. The transfer request may include control information for controlling a communication bandwidth or the like (e.g., 64 Kbps).

The terminal ID-location information associating unit 12 is connected to the routing information setting instructing unit 14. The unit 12 stores "terminal IDs" of terminals located in the network 1 and associated "location information" of the terminals.

The location information-transfer device ID associating unit 13 is connected to the routing information setting instructing unit 14. The unit 13 stores "transfer device IDs" and associated "location information" of the terminals which can be connected to the transfer devices.

When the first terminal 51 and the second terminal 52 are connected to the transfer devices (access points) $30_1$ and $20_1$, for example, in the subnetworks 2 and 3 in a wired system, the terminal ID-location information associating unit 12 and the location information-transfer device ID associating unit 13 may be united to associate the "terminal IDs" with the "transfer device IDs" to which the terminals are connected.

The routing information setting instructing unit 14 is connected to the transfer request receiver 11, the terminal ID-location information associating unit 12 and the location information-transfer device ID associating unit 13. The routing information setting instructing unit 14 constitutes an instruction information transmitter for transmitting, in response to a transfer request transmitted through the transfer request receiver 11, a "routing information setting instruction (instruction information)" including the "destination transfer device ID (routing information for routing the data to the second transfer device $20_1$)" associated with the "second terminal ID (ID-terminal 51)." The "routing information setting instruction can include a terminal ID identifying a terminal connected to the destination transfer device, instead of the destination transfer device ID.

The "routing information setting instruction (instruction information)" may include control information included in the transfer request.

More specifically, the routing information setting instructing unit 14 searches the terminal ID-location information associating unit 12 and the location information-transfer device ID associating unit 13, with the "second terminal ID (ID-terminal 51)" included in the transfer request as a keyword, thereby obtaining the "information identifying the second transfer device $20_1$ (routing information for routing the data to the second transfer device $20_1$)" associated with the "second terminal ID (ID-terminal 51)," and transmits to each of the plurality of transfer devices $20_3$, $30_1$ and $30_3$ a "routing information setting instruction (instruction information)" including the "information identifying the second transfer device $20_1$ (RA-$20_1$)" and "transfer information (RA-$30_3$)."

The routing information setting instructing unit 14 may transmit the "routing information setting instruction (instruction information)" to all transfer devices located in the network 1.

In this embodiment, the routing information setting instructing unit 14 constitutes a second memory which stores the "second terminal ID (ID-terminal 51)" and the "second transfer device ID, that is, the routing information for routing the data to the second transfer device (e.g., RA-$20_1$ for the transfer device $30_1$)," associating them with one another. The routing information can be a terminal ID identifying a terminal connected to the transfer device $30_1$, instead of RA-$20_1$.

The memory contents of the second memory may be set by a network administrator or may be dynamically obtained by the network manager 10 from a transfer device in a specified area upon the transfer request.

The plurality of transfer devices 20 and 30 cooperatively transfer from the first terminal 52 to the second terminal 51 the data including the "second terminal ID (ID-terminal 51)" as the destination address and the "first terminal ID (ID-terminal 52)" as the source address.

Figure 3:
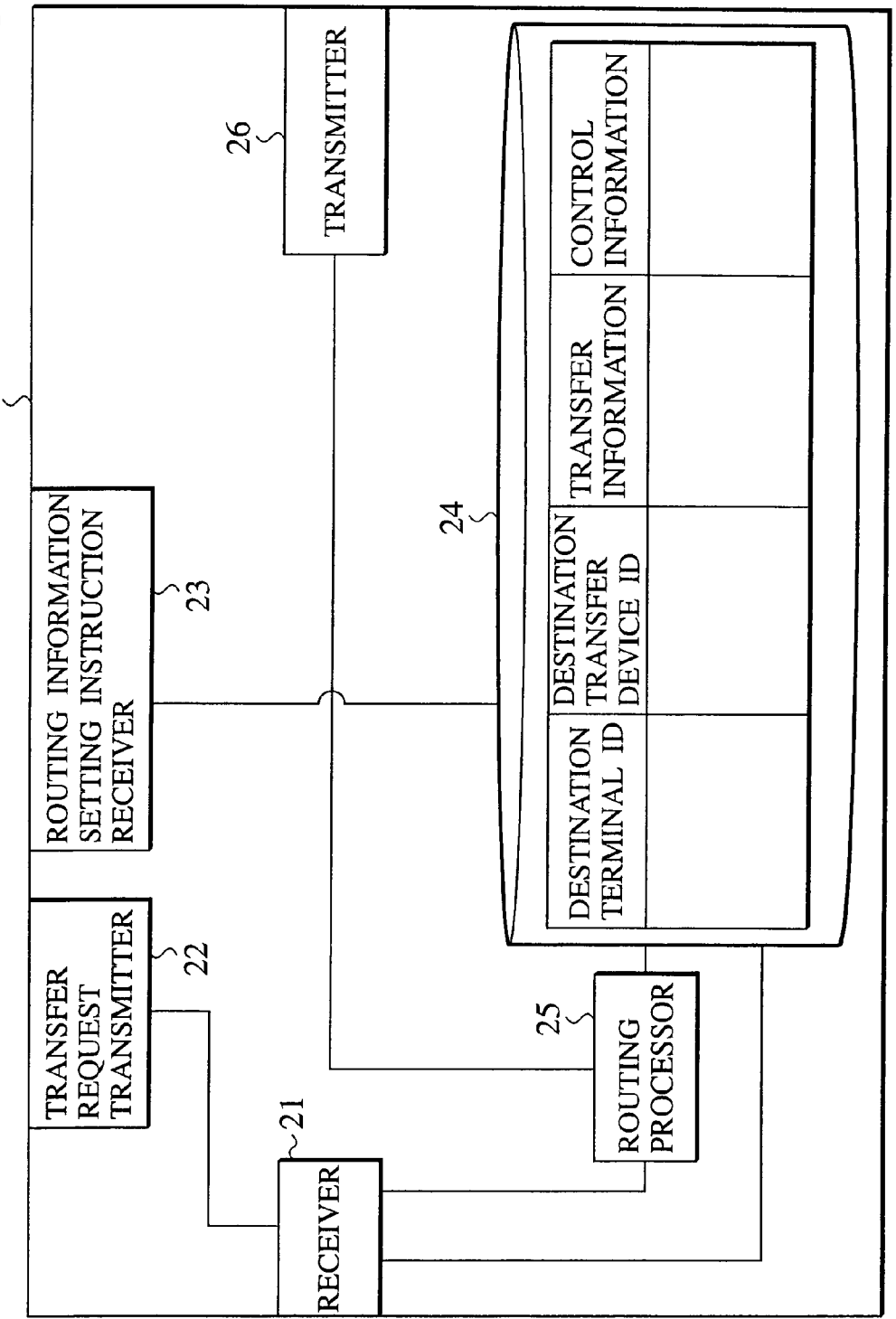
FIG. 3 is a functional block diagram of a transfer device according to the first embodiment of the present invention.

More specifically, the transfer devices 20 and 30 each include, as shown in FIG. 3, a receiver 21, a transfer request transmitter 22, a routing information setting instruction receiver 23, a terminal ID-routing information-control information associating unit 24, a routing processor 25, and a transmitter 26. Description will be made below with the first transfer device $30_1$ to which the first terminal 52 is connected.

The receiver 21 is connected to the transfer request transmitter 22, terminal ID-routing information-control information associating unit 24 and routing processor 25. The receiver 21 receives data transmitted from the first terminal 52 and transfers the received data to the routing processor 25.

When receiving only data including a data transmission request or a data transmission request from the first terminal 52, the receiver 21 searches, in response to the data transmission request, the terminal ID-routing information-control information associating unit 24 for a record including the "second terminal ID" included in the data (or data transmission request).

When the terminal ID-routing information-control information associating unit 24 includes the record, the receiver 21 transfers to the routing processor 25 the data including the data transmission request or data transmitted subsequently to the data transmission request.

When the terminal ID-routing information-control information associating unit 24 does not include the record, the receiver 21 transfers the data transmission request including the "second terminal ID" to the transfer request transmitter 22.

The data transmission request includes, for example, the "first terminal ID (ID-terminal 52)" as the source address, the "second terminal ID (ID-terminal 51)" as the destination address, and control information for controlling the communication bandwidth or the like (e.g., 64 Kbps). When it is desired to change the condition of communications with the second terminal 51, the first terminal 52 transmits data transmission request including the control information to the transfer device $30_1$.

The transfer request transmitter 22 is connected to the receiver 21. In response to the "data transmission request" transmitted through the receiver 21, the transmitter 22 transmits a transfer request including the "second terminal ID (ID-terminal 51)" and the "control information (e.g., 64 Kbps)" to the network manager 10.

The routing information setting instruction receiver 23 is connected to the terminal ID-routing information-control information associating unit 24. The receiver 23 receives a "routing information setting instruction (instruction information)" transmitted from the network manager 10 and updates the memory contents of the terminal ID-routing information-control information associating unit 24 according to the received "routing information setting instruction (instruction information)."

The terminal ID-routing information-control information associating unit 24 is connected to the routing information setting instruction receiver 23 and the routing processor 25.

The unit 24 constitutes a first memory storing "IDs of destination terminals (destination terminal IDs)," "IDs of transfer devices (destination transfer device IDs) to which the destination terminals are connected," "transfer information" for the transfer of the received data, and the "control information" for the transmission of data to the transfer devices, associating them with one another.

FIG. 4 illustrates an example of the memory contents of the terminal ID-routing information-control information associating unit 24 of the first transfer device $30_1$. In the example of FIG. 4, the terminal ID-routing information-control information associating unit 24 stores a first record including the "destination terminal ID=ID-terminal 51 (information identifying the second terminal 51, second terminal ID)," the "destination transfer device ID=RA-$20_1$ (information identifying the second transfer device $20_1$)," the "transfer information=RA-$30_3$ (information identifying the transfer device $30_3$)" and the "control information=64 Kbps," and a second record including the "destination terminal ID=ID-terminal 52 (information identifying the first terminal 51, first terminal ID)," the "destination transfer device ID=RA-$30_1$ (information identifying the first transfer device $30_1$)," the "transfer information=Wireless (wireless connection)" and the "control information=none." The second record shows that the first terminal 52 is wirelessly connected to the first transfer device $30_1$.

The routing processor 25 is connected to the receiver 21, the terminal ID-routing information-control information associating unit 24 and the transmitter 26. The routing processor 25 adds to the data the "routing information for routing the data to the destination transfer device $20_1$ (ID RA-$20_1$ of the second transfer device $20_1$)" associated with the "second terminal ID (ID-terminal 51)" included in the data transmitted via the receiver 21 from the first terminal 52, and transfers the data via the transmitter 26 to the transfer device $30_3$ based on the "control information (e.g., 64 Kbps)" associated with the "second terminal ID (ID-terminal 51)."

The transmitter 26 is connected to the routing processor 25. The transmitter 26 transfers the data transmitted from the routing processor 25 to the second transfer device $20_1$, that is, to the transfer device $30_3$.

Operation of the Communications System in Embodiment 1

Figure 5:
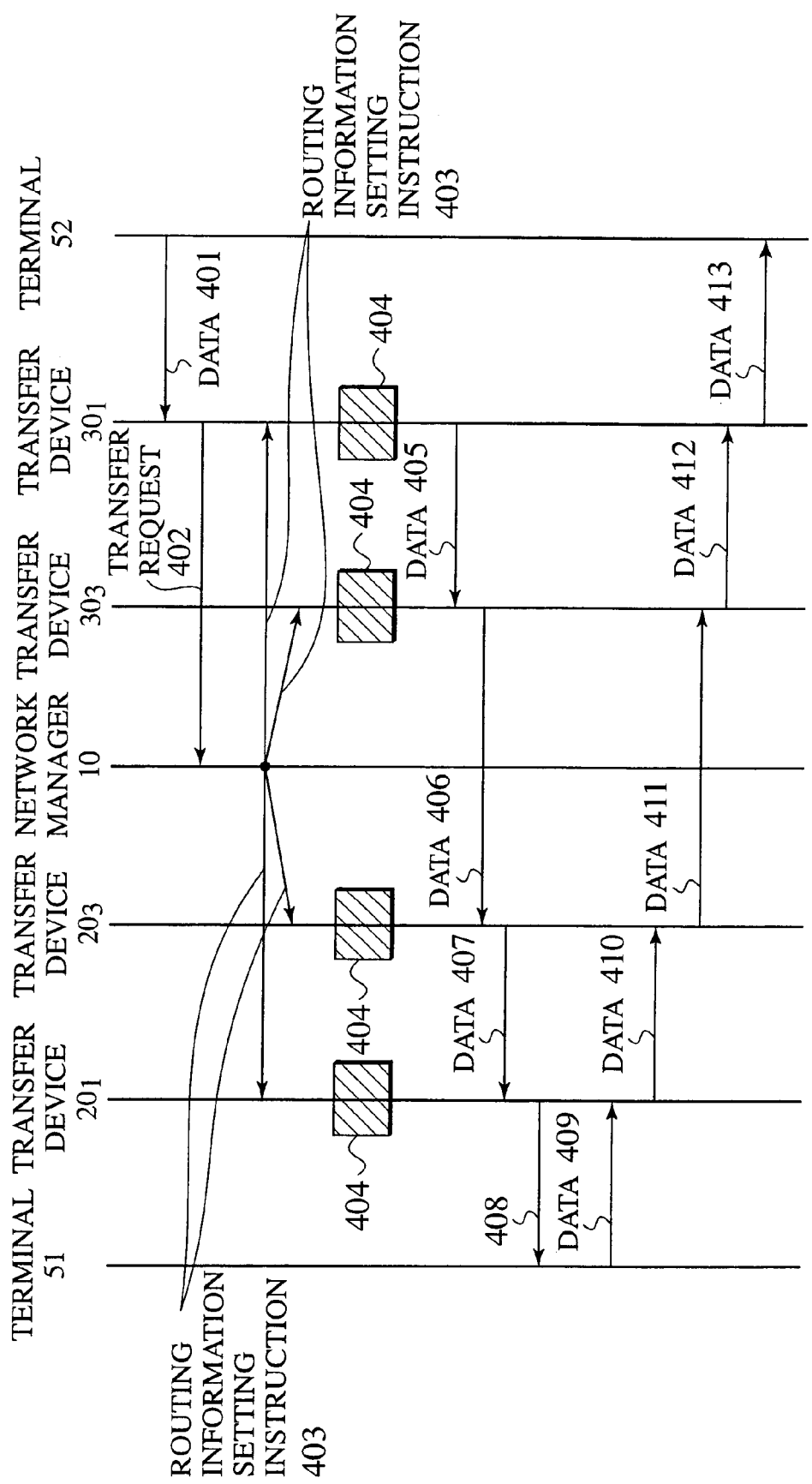
FIG. 5 is a sequence diagram illustrating the operation of the communications system according to the first embodiment of the present invention.

The operation of the communications system according to this embodiment will be described with reference to FIGS. 5 and 6. FIG. 5 is a sequence diagram illustrating the operation of the communications system of this embodiment.

As shown in FIG. 5, in step 401, the first terminal 52 transmits data (including a data transmission request) including the destination address "second terminal ID (destination ID, ID-terminal 51)," the source address "first terminal ID (source terminal ID, ID-terminal 52)," control information (e.g., communication speed=64 Kbps) and user information (such as a payload) to the first transfer device $30_1$. A data format for the transmission is shown in FIG. 6A.

Upon receiving the data transmission request, the receiver 21 of the first transfer device $30_1$ searches the terminal ID-routing information-control information associating unit 24 for a record including the "second terminal ID (ID-terminal 51 )" as the "destination terminal ID."

When the terminal ID-routing information-control information associating unit 24 includes the record, the routing processor 25 adds, in step 405, to the data the "destination transfer device ID, that is, the routing information for routing the data to the second transfer device $20_1$ (ID RA-$20_1$ of the second transfer device $20_1$)" associated with the "second terminal ID (ID-terminal 51)," and transfers the data to the transfer device $30_3$ specified in the "transfer information" associated with the "second terminal ID (ID-terminal 51)," based on the "control information" associated with the "second terminal ID (ID-terminal 51)" (see FIG. 6B).

When the terminal ID-routing information-control information associating unit 24 does not include the record, the transfer request transmitter 22 transmits, in step 402, to the network manager 10 a "transfer request" including the "second terminal ID (ID-terminal 51)" and the "control information (communication speed=64 Kbps)."

In step 403, upon the transfer request received via the transfer request receiver 11, the routing information setting instructing unit 14 of the network manager 10 searches the terminal ID-location information associating unit 12 and the location information-transfer device ID associating unit 13, with the "second terminal ID (ID-terminal 51)" included in the transfer request as a keyword.

The routing information setting instructing unit 14 obtains the "destination transfer device ID (ID RA-$20_1$ of the second transfer device $20_1$)" associated with the "second terminal ID (ID-terminal 51)" and transmits to the plurality of transfer devices $20_1$, $20_3$, $30_1$ and $30_3$, a "routing information setting instruction (instruction information)" including the "routing information for routing the data to the second transfer device $20_1$ (ID RA-$20_1$ of the second transfer device $20_1$)," the "transfer information (ID RA-$30_3$ of the transfer device $30_3$)" and the "control information (communication speed=64 Kbps)."

In step 404, the routing information setting instruction receiver 23 of each of the plurality of transfer devices $20_1$, $20_3$, $30_1$ and $30_3$ updates the memory contents of the terminal ID-routing information-control information associating unit 24 according to the "routing information setting instruction (instruction information)" received from the network manager 10. The routing information setting instruction receiver 23 of the first transfer device $30_1$, for example, updates the terminal ID-routing information-control information associating unit 24 according to the "routing information setting instruction (instruction information)" as shown in FIG. 4.

In step 405, the routing processor 25 of the first transfer device $30_1$ adds to the data the "routing information for routing the data to the second transfer device (ID RA-$20_1$)" associated with the "second terminal ID (ID-terminal 51)" included in the data transmitted via the receiver 21 from the first terminal 52, and transfers the data via the transmitter 26 to the transfer device $30_3$ specified in the "transfer information" associated with the "second terminal ID (ID-terminal 51)," based on the "control information (communication speed=64 Kbps)" associated with the "second terminal ID (ID-terminal 51)."

The data transmitted includes, as shown in FIG. 6B, the "routing information for routing the data to the second transfer device $20_1$ (RA-$20_1$)," the destination address "second terminal ID (destination terminal ID, ID-terminal 51)," the source address "first terminal ID (source terminal ID, ID-terminal 52)" and the "user information (payload)."

In step 406, the transfer device $30_3$ transfers, in the same manner as the first transfer device $30_1$, the data received from the first transfer device $30_1$ to the transfer device $20_3$ connected to the subnetwork 2. The data transmitted includes, as shown in FIG. 6B, the "routing information for routing the data to the second transfer device $20_1$ (ID RA-$20_1$)," the destination address "second terminal ID (destination terminal ID, ID-terminal 51)," the source address "first terminal ID (source terminal ID, ID-terminal 52)" and the "user information." The data is transferred at the communication speed of 64 Kbps based on the "control information (communication speed=64 Kbps)."

In step 407, the transfer device $20_3$ transfers, in the same manner as the first transfer device $30_1$, the data received from the transfer device $30_3$ to the second transfer device $20_1$. The data transferred includes, as shown in FIG. 6B, the "routing information for routing the data to the second transfer device $20_1$ (RA-$20_1$)," the destination address "second terminal ID (destination terminal ID, ID-terminal 51)," the source address "first terminal ID (source terminal ID, ID-terminal 52)" and the "user information." The data is transferred at the communication speed of 64 Kbps based on the "control information (communication speed=64 Kbps)."

In step 408, the second transfer device $20_1$ deletes the "routing information for routing the data to the second transfer device $20_1$ (RA-$20_1$)" from the data received from the transfer device $20_3$ and transmits the data to the second terminal 51. The data transferred includes, as shown in FIG. 6A, the destination address "second terminal ID (destination terminal ID, ID-terminal 51)," the source address "first terminal ID (source terminal ID, ID-terminal 52)" and the "user information."

In step 409, the second terminal 51 transmits data (including a data transmission request) including the destination address "first terminal ID (destination terminal ID, ID-terminal 52)," the source address "second terminal ID (source terminal ID, ID-terminal 51)," the "control information (communication speed=64 Kbps)" and the "user information," to the second transfer device $20_1$.

In step 410, the receiver 21 of the second transfer device $20_1$ searches the terminal ID-routing information-control information associating unit 24 for a record including the "first terminal ID (destination terminal ID, ID-terminal 52)" as the "destination terminal ID," according to the data including the data transmission request.

When the terminal ID-routing information-control information associating unit 24 includes the record, the routing processor 25 of the second transfer device $20_1$ adds, in step 410, to the data "routing information for routing the data to the first transfer device (RA-$30_1$)" associated with the "first terminal ID (destination terminal ID, ID-terminal 52)," and transfers the data via the transmitter 26 to the transfer device $20_3$ specified in the "transfer information" associated with the "first terminal ID (destination terminal ID, ID-terminal 52)," based on the "control information."

The data transmitted includes, as shown in FIG. 6B, the "routing information for routing the data to the first transfer device $30_1$ (ID RA-$30_1$)," the destination address "first terminal ID (destination terminal ID, ID-terminal 52)," the source address "second terminal ID (source terminal ID, ID-terminal 51 )" and the "user information."

In step 411, the transfer device $20_3$ transfers, in the same manner as the second transfer device $20_1$, the data received from the second transfer device $20_1$ to the transfer device $30_3$ connected to the subnetwork 3. The data transferred includes, as shown in FIG. 6B, the "routing information for routing the data to the first transfer device $30_1$ (ID RA-$30_1$)," the destination address "first terminal ID (destination terminal ID, ID-terminal 52)," the source address "second terminal ID (source terminal ID, ID-terminal 51)" and the "user information." The data is transferred at the communication speed of 64 Kbps based on the "control information (communication speed=64 Kbps)."

In step 412, the transfer device $30_3$ transfers, in the same manner as the second transfer device $20_1$, the data received from the transfer device $20_3$ to the first transfer device $30_1$.

The data transferred includes, as shown in FIG. 6B, the "routing information for routing the data to the first transfer device $30_1$ (ID RA-$30_1$)," the destination address "first terminal ID (destination terminal ID, ID-terminal 52)," the source address "second terminal ID (source terminal ID, ID-terminal 51)" and the "user information." The data is transferred at the communication speed of 64 Kbps based on the "control information (communication speed=64 Kbps)."

In step 413, the first transfer device $30_1$ deletes the "routing information for routing the data to the first transfer device $30_1$ (RA-$30_1$)" from the data received from the transfer device $30_3$ and transmits the data to the first terminal 52. The data transferred includes, as shown in FIG. 6A, the destination address "first terminal ID (destination terminal ID, ID-terminal 52)," the source address "second terminal ID (source terminal ID, ID-terminal 51)" and the "user information."

Function/Effect of the Communications System in Embodiment 1

According to the communications system of this embodiment, the terminal ID-routing information-control information associating unit 24 of the first transfer device $30_1$ stores the "the second terminal (destination terminal) ID (ID-terminal 51)" and the "routing information for routing the data to the second transfer device $20_1$ (RA-$20_1$)," associating them with one another, and the routing processor 25 adds to the data the "routing information for routing the data to the second transfer device $20_1$ (RA-$20_1$) associated with the "second terminal ID (ID-terminal 51)" and transfers the data from the first terminal 52 to the second terminal 51. This eliminates the need for going through a relay point (home agent) constituting a triangular path.

According to the communications system of this embodiment, the first terminal (source terminal) 52 only needs to transmit data including the "second terminal ID(destination terminal) (ID-terminal 51)" as the destination address. This eliminates the need for complicated settings at the first terminal 52.

The communications system of this embodiment further eliminates the need for holding, at the first terminal 52, both address information assigned by the access network (subnetwork 3) and the home address of the first terminal 52, and performing the release of encapsulation or the like of packets or the like received.

According to the communications system of this embodiment, the first terminal 52 does not need to transmit the "routing information for routing the data to the second transfer device (RA-$20_1$)" to the access point in the access network (first transfer device $30_1$). This eliminates the need for transmitting and receiving packets in a format including an information element as an overhead also in a radio section or the like between the first terminal 52 and the access point in the access network (first transfer device $30_1$).

Configuration of a Communications System in Embodiment 2

The configuration of a communications system according to a second embodiment of the present invention will be described mainly on difference from the communications system according to the first embodiment. The entire configuration of the communications system in the second embodiment of this invention is identical to that of the communications system of the first embodiment.

A network manager 10 includes, as shown in FIG. 7A, instead of the terminal ID-location information associating unit 12 and the location information-transfer device ID associating unit 13 in the first embodiment, a third memory storing a "communication ID element," a "source terminal ID (first terminal ID)," a "destination terminal ID (second terminal ID)" and a "destination transfer device ID (routing information for routing the data to a second transfer device)," associating them with one another.

A routing information setting instructing unit 14 of the network manager 10 constitutes an instruction information transmitter for transmitting, upon a transfer request including the "first and second terminal IDs" transmitted from a first transfer device $30_1$, a "routing information setting instruction (instruction information)" including the "routing information for routing the data to the second transfer device (destination transfer device ID)" and the "communication ID element" associated with the "first and second terminal IDs."

When a receiver 22 of the first transfer device $30_1$ receives a "data transmission request" including the destination address "second terminal ID," the source address "first terminal ID" and "control information (communication speed=64 Kbps)," the receiver 22 searches a terminal ID-routing information-control information associating unit 24 for a record including the "first terminal ID" and the "second terminal ID" included in the received "data transmission request."

When the terminal ID-routing information-control information associating unit 24 includes the record, the receiver 21 transmits a "transmission setting response" including the "communication ID element" associated with the record, to the first terminal 52.

When the terminal ID-routing information-control information associating unit 24 does not include the record, the receiver 21 transfers the "data transmission request" to a transfer request transmitter 22.

When receiving data including the "communication ID element" from the first terminal 52, the receiver 21 transfers the data to a routing processor 25.

The transfer request transmitter 22 transmits, upon the "data transmission request" received through the receiver 21, a "transfer request" including the "first terminal ID," the "second terminal ID" and "the control information" to the network manager 10.

In this embodiment, the receiver 21 and the transfer request transmitter 22 constitute a transfer request transmitter for transmitting a "transfer request" to the network manager 10 when receiving a "data transmission request" from the first terminal 52.

A routing information setting instruction receiver 23 updates the memory contents of the terminal ID-routing information-control information associating unit 24, according to a "routing information setting instruction (instructing information)" received from the network manager 10.

The terminal ID-routing information-control information associating unit 24 constitutes a first memory storing, as shown in FIG. 7B, "communication ID elements," "source terminal IDs (first terminal IDs)," "destination terminal IDs (second terminal IDs)," "destination transfer device IDs (routing information for routing the data to the second transfer devices)," "transfer information" and "control information," associating them with one another.

FIG. 7B illustrates an example of the memory contents of the terminal ID-routing information-control information associating unit 24. In the example of FIG. 7B, the terminal ID-routing information-control information associating unit 24 stores a first record including a "communication ID element=71," a "source terminal ID=ID-terminal 52," a "destination terminal ID=ID-terminal 51," a "destination transfer terminal ID=RA-$20_1$ (information identifying the second transfer device $20_1$," "transfer information=RA-$30_3$" and "control information=64 Kbps," and a second record including a "communication ID element=72," a "source terminal ID=ID-terminal 51," a "destination terminal ID=ID-terminal 52," a "destination transfer terminal ID=RA-$30_1$ (information identifying the first transfer device $30_1$," "transfer information=Wireless" and "control information=none."

The routing processor 25 adds to the data the "destination transfer device ID (routing information for routing the data to the second transfer device" associated with the "communication ID element" included in the data received through the receiver 21, and transfers the data to the transfer device specified in the "transfer information" associated with the "communication ID element" based on the "control information."

Operation of the Communications System in Embodiment 2

Figure 8:
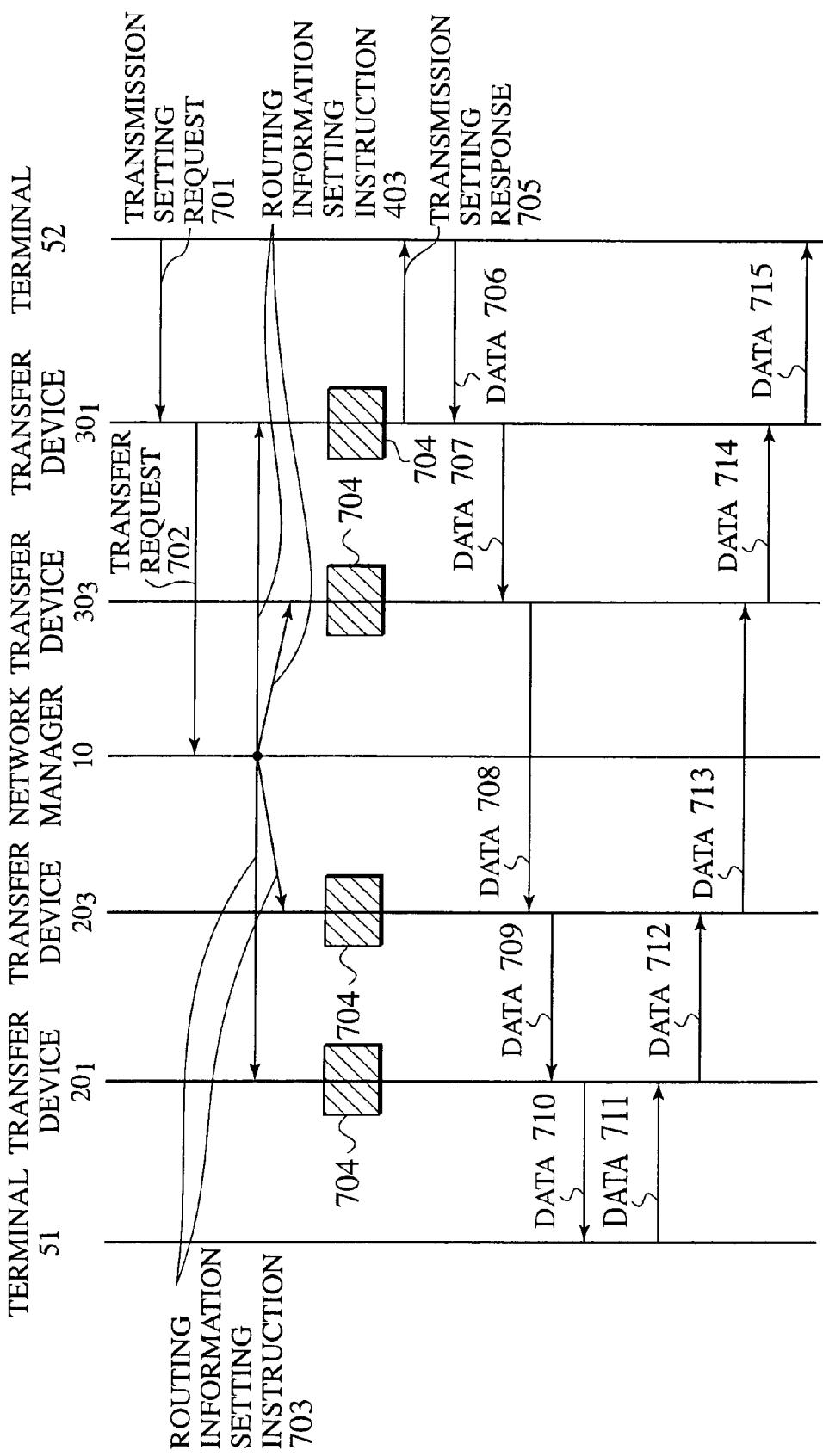
FIG. 8 is a sequence diagram illustrating the operation of a communications system according to the second embodiment of the present invention.

The operation of the communications system according to this embodiment will be described with reference to FIGS. 8 and 9. FIG. 8 is a sequence diagram illustrating the operation of the communications system of this embodiment.

As shown in FIG. 8, in step 701, the first terminal 52 transmits a "data transmission request" including the destination address "second terminal ID (destination ID, ID-terminal 51)," the source address "first terminal ID (source terminal ID, ID-terminal 52)" and control information (e.g., communication speed=64 Kbps) to the first transfer device $30_1$. A data format for the transmission is shown in FIG. 9A.

The receiver 21 of the first transfer device $30_1$ searches, upon the "data transmission request," the terminal ID-routing information-control information associating unit 24 for a record including the "second terminal ID (destination terminal ID, ID-terminal 51)" and the "first terminal ID (source terminal ID, ID-terminal 52)."

When the terminal ID-routing information-control information associating unit 24 includes the record, the receiver 21 of the first transfer device $30_1$ transmits, in step 705, in response to the "data transmission request," a "transmission setting response" including the "communication ID element" associated with the "second terminal ID (destination terminal ID, ID-terminal 51)" and the "first terminal ID (source terminal ID, ID-terminal 52)", to the first terminal 52.

When the terminal ID-routing information-control information associating unit 24 does not include the record, the transfer request transmitter 22 of the first transfer device $30_1$ transmits, in step 702, to the network manager 10 a "transfer request" including the "second terminal ID (destination terminal ID, ID-terminal 51)," the "first terminal ID (source terminal ID, ID-terminal 52)" and the "control information (communication speed=64 Kbps)."

In step 703, upon the transfer request received via the transfer request receiver 11, the routing information setting instructing unit 14 of the network manager 10 searches the third memory, with the "second terminal ID (ID-terminal 51)" and the "first terminal ID (ID-terminal 52)" included in the transfer request as keywords.

The routing information setting instructing unit 14 obtains the "communication ID element," the "destination transfer device ID" and the "transfer information" associated with the "second terminal ID (ID-terminal 51)" and the "first terminal ID (ID-terminal 52)," and transmits to a plurality of transfer devices $20_1$, $20_3$, $30_1$ and $30_3$, a "routing information setting instruction (instruction information)" including the "communication ID element (71)," the "destination transfer device ID" and the "transfer information."

In step 704, the routing information setting instruction receiver 23 of each of the plurality of transfer devices 20$_1$, 20$_3$, 30$_1$ and 30$_3$ updates the memory contents of the terminal ID-routing information-control information associating unit 24 according to the "routing information setting instruction (instruction information)" received from the network manager 10. The routing information setting instruction receiver 23 of the first transfer device 30$_1$, for example, updates the terminal ID-routing information-control information associating unit 24 according to the "routing information setting instruction (instruction information)" as shown in FIG. 7B.

In step 705, the receiver 21 of the first transfer device 30$_1$ transmits to the first terminal 52 a "transfer setting response" including the "communication ID element (71)" associated with the "second terminal ID (destination terminal ID, ID-terminal 51)" and the "first terminal ID (source terminal ID, ID-terminal 52)."

In step 706, the first terminal 52 transmits data including the "communication ID element (71)." The data transmitted includes, as shown in FIG. 9B, the "communication ID element (71)" and "user information."

In step 707, the routing processor 25 of the first transfer device 30$_1$ adds to the data the "destination transfer device ID (routing information for routing the data to the second transfer device, RA-20$_1$)" associated with the "communication ID element (71)" included in the data transmitted via the receiver 21 from the first terminal 52, and transfers the data via the transmitter 26 to the transfer device 30$_3$ specified in the "transfer information" associated with the "communication ID element (71)."

The data transmitted includes, as shown in FIG. 9C, the "destination transfer device ID (routing information for routing the data to the second transfer device 20$_1$, RA-20$_1$)," the communication ID element (71)" and the "user information." The data is transferred at the communication speed of 64 Kbps based on the "control information (communication speed=64 Kbps)."

In step 708, the transfer device 30$_3$ transfers, in the same manner as the first transfer device 30$_1$, the data received from the first transfer device 30$_1$ to the transfer device 20$_3$ connected to a subnetwork 2. The data transferred includes, as shown in FIG. 9C, the "destination transfer device ID (routing information RA-20$_1$ of the second transfer device 20$_1$)," the communication ID element (71)" and the "user information." The data is transferred at the communication speed of 64 Kbps based on the "control information (communication speed=64 Kbps)."

In step 709, the transfer device 20$_3$ transfers, in the same manner as the first transfer device 30$_3$, the data received from the transfer device 30$_3$ to the second transfer device 20$_1$. The data transferred includes, as shown in FIG. 9C, the "destination transfer device ID (routing information RA-20$_1$ of the second transfer device 20$_1$)," the communication ID element (71)" and the "user information." The data is transferred at the communication speed of 64 Kbps based on the "control information (communication speed=64 Kbps)."

In step 710, the second transfer device 20$_1$ deletes the "destination transfer device ID (routing information RA-20$_1$ of the second transfer device)" from the data received from the transfer device 20$_3$ and transmits the data to the second terminal 51. The data transmitted includes, as shown in FIG. 9B, the "communication ID element (71)" and the "user information."

In step 711, the second terminal 51 transmits data including the "communication ID element (71)." The data transmitted includes, as shown in FIG. 9B, the "communication ID element (71)" and the "user information."

In the following steps 712 to 715, the data is transmitted to the first terminal 51 in the same manner as in steps 707 to 710.

Function/Effect of the Communications System in Embodiment 2

According to the communications system of this embodiment, since the routing processor 25 adds to the data the routing information associated with the communication ID element included in the data received from the first terminal 52 and transfers the data to the second transfer device 20$_1$, the first terminal ID and the second terminal ID are not included in data transferred in the communications system, increasing the confidentiality of communications.

Communications System in Embodiment 3

A communications system according to a third embodiment of the present invention will be described mainly on difference from the communications system of the first embodiment.

The communications system according to this embodiment is different from the communication system of the first embodiment in that a routing information setting instructing unit 14 of a network manager 10 transmits a "routing information setting instruction (instruction information)" to a second transfer device 20$_1$ instead of transmitting to a plurality of transfer devices 20$_1$, 20$_3$, 30$_1$ and 30$_3$, and the second transfer device 20$_1$ transmits the "routing information setting instruction (instruction information)" to the plurality of transfer devices 20$_3$, 30$_1$ and 30$_3$.

Figure 10:
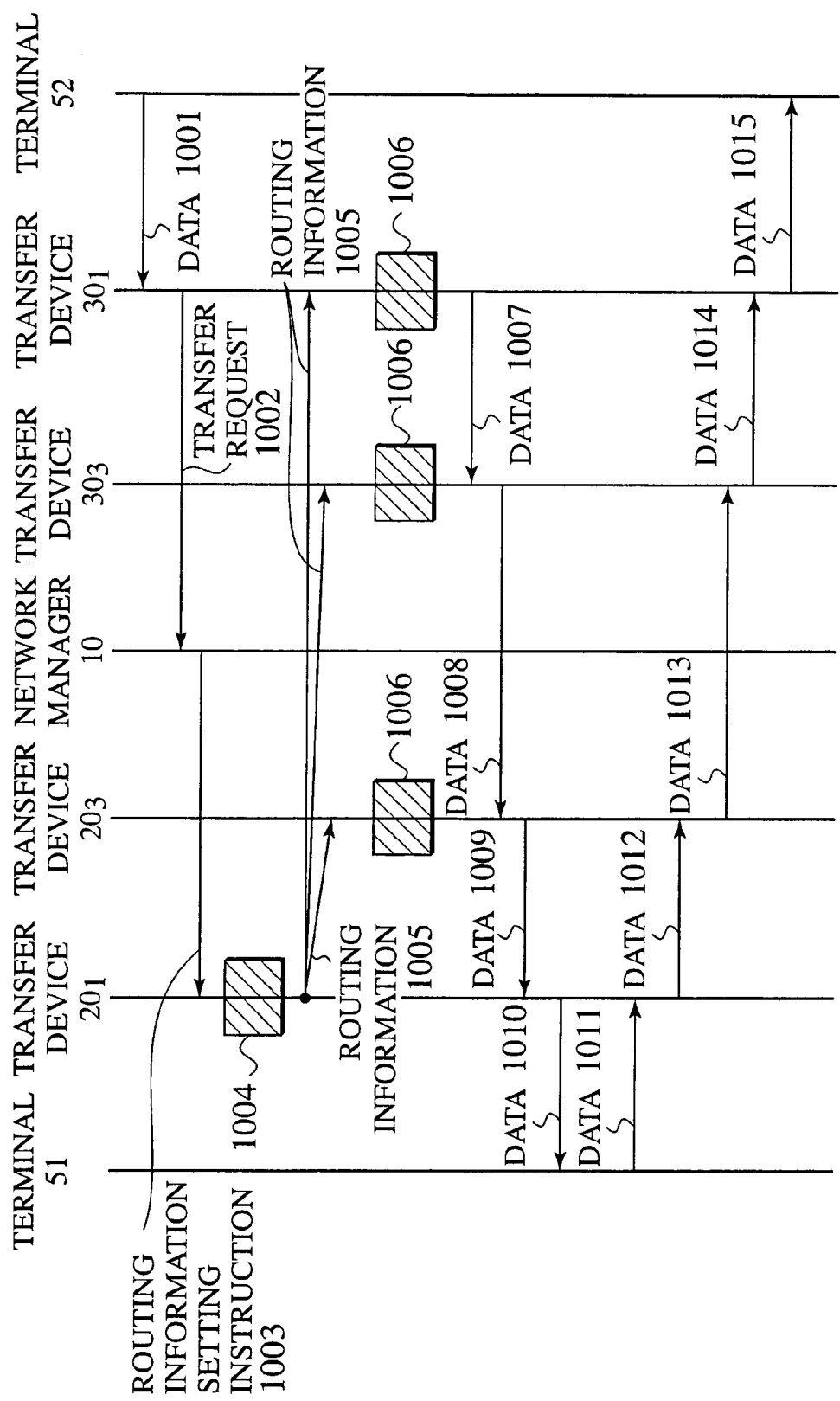
FIG. 10 is a sequence diagram illustrating the operation of a communications system according to a third embodiment of the present invention.

The operation of the communications system of this embodiment is identical to the operation of the communications system of the first embodiment except that in step 1003 in FIG. 10, the routing information setting instructing unit 14 of the network manager 10 transmits a "routing information setting instruction (instruction information)" to the second transfer device 20$_1$, and in step 1005, the second transfer device 20$_1$ transmits the "routing information setting instruction (instruction information)" to the plurality of transfer devices 20$_3$, 30$_1$ and 30$_3$.

Modification

In the communications systems of the above embodiments, the terminal ID-routing information-control information associating unit 24 may store, as the "transfer information," the type of radio communications with the first terminal 52 or the "port number" for use in the radio communications.

The communications systems of the above embodiments may use other formats instead of those shown in FIGS. 6 and 9.

The communications systems of the above embodiments may use, as the "control information," data encryption information.

In the communications system of the above embodiment, at least one of the "first terminal ID" and the "second terminal ID" may be changed to a distinct independent ID in the network 1 or the subnetworks 2 or 3.

FIGS. 11A and 11B illustrate an example of data formats for use in changing to a distinct independent ID. FIG. 12 illustrates an example of the configuration of the terminal ID-routing information-control information associating unit 24 at that time.

The routing processor 25 changes the "second terminal ID (destination terminal ID)" included in data received from the first terminal 52 to the corresponding "network destination terminal ID," adding to the data routing information for routing the data to the "destination transfer device ID (NWID-terminal 51)" associated with the "second terminal ID (destination terminal ID)."

As shown in FIG. 11B, the routing processor 25 may change the "first terminal ID (source terminal ID)" included in data received from the first terminal 52 to the corresponding "network destination terminal ID."

In the communications system of the above embodiment, the "communication ID element" may be changed to a distinct independent ID in the network 1 or subnetworks 2 or 3.

When a system in which the "transfer information" agrees with the "destination transfer device ID" in the memory contents of the terminal ID-routing information-control information associating unit 24 in FIGS. 4, 7 or 12 is used, the "transfer information" may be omitted.

When the network manager 10 manages "source terminal IDs" and "destination terminal IDs" associated with "communication ID elements," "source terminal IDs" and "destination terminal IDs" may be omitted in the memory contents of the terminal ID-routing information-control information associating unit 24 in FIG. 7. When destination terminal IDs are not included, for example, communication ID elements may be associated with routing information.

In the communication systems of the above embodiments, the processing performed in the first transfer device $30_1$ may be performed in the other transfer device $20_1$, $20_3$ or $30_3$.

Effects of the Invention

As described above, the present invention provides a communications system and a communications method which allow transfer of data not using a terminal ID assigned by an access network but using routing information distinct from the terminal ID, and a transfer device and a network manager suitable for use therein.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A communications system for transmitting data including, as a destination address, a second terminal ID, from a first terminal to a second terminal via a plurality of access points, the system comprising:
    a first access point wirelessly connected to the first terminal, the first access point including:
        a first memory configured to store a first terminal ID, the second terminal ID, a destination transfer device ID identifying a second access point wirelessly connected to the second terminal, and a communication ID element, which is an element to identify communication with the first terminal and the second terminal, associating them with one another;
        a receiver configured to search the first memory in accordance with a data transmission request including the first terminal ID and the second terminal ID and control information, the data transmission request received from the first terminal, and to transmit a transmission setting response including the communication ID element associated with the first terminal ID and the second terminal ID, to the first terminal; and
        a routing processor configured to add to the data the destination transfer device ID identifying the second access point and being associated with the communication ID element included in the data, the data received from the first terminal in accordance with the transmission setting response, and to transfer the data to the second access point; and
    a network manager, including
        a third memory configured to store the first terminal ID, the second terminal ID, the destination transfer device ID identifying the second access point and the communication ID element, associating them with one another; and
        an instruction information transmitter configured to transmit instruction information including the destination transfer device ID identifying the second access point and the communication ID element associated with the first terminal ID and the second terminal ID, in response to a transfer request including the first terminal ID and the second terminal ID transmitted from the first access point,
    wherein the first access point further comprises a transfer request transmitter configured to transmit the transfer request including the first terminal ID and the second terminal ID to the network manager upon receiving a transmission request for the data from the first terminal; and
    the first memory is configured to store the first terminal ID, the second terminal ID, the destination transfer device ID identifying the second access point, and the communication ID element, associating then with one another, according to the instruction information from the network manager.

2. A communications method of transmitting data including, as a destination address, a second terminal ID, from a first terminal to a second terminal via a plurality of access points, the method comprising:
    receiving, at first access point, which is wirelessly connected to the first terminal, a data transmission request including a first terminal ID and the second terminal ID and control information, from the first terminal;
    searching, at the first access point, a first memory configured to store the first terminal ID, the second terminal ID, a destination transfer device ID identifying a second access point to which the second terminal is wirelessly connected, and a communication ID element, which is an element to identify communication with the first terminal and the second terminal, associating them with one another, in accordance with the data transmission request, and to transmit a transmission setting response including the communication ID element associated with the first terminal ID and the second terminal ID, to the first terminal;
    adding to the data, at the first access point, the destination transfer device ID identifying the second access point and being associated with the communication ID element included in the data received from the first terminal, and transferring the data to the second access point;
    transmitting, at the first access point, a transfer request including the first terminal ID and the second terminal ID to a network manager which stores the first terminal ID, the second terminal ID, the destination transfer device ID identifying the second access point and the communication ID element, associating them with one another, upon receiving a transmission request for the data from the first terminal;

transmitting, at the network manager, instruction information including the destination transfer device ID identifying the second access point and the communication ID element associated with the first terminal ID and the second terminal ID, in response to the transfer request including the first terminal ID and the second terminal ID transmitted from the first access point; and storing, at the first access point, the first terminal ID, the second terminal ID, the destination transfer device ID identifying the second access point, and the communication ID element, associating them with one another, according to the instruction information from the network manager.

* * * * *